United States Patent [19]

Mollod et al.

[11] 3,774,210
[45] Nov. 20, 1973

[54] AUTOMATIC CALIBRATION OF LORAN ENVELOPE TO CYCLE DISCREPANCY

[75] Inventors: Leonard D. Mollod, New York, N.Y.; LeRoy D. Steele, Paterson, N.J.

[73] Assignee: International Telephone and Telegraph Corporation, Nutley, N.J.

[22] Filed: June 21, 1972

[21] Appl. No.: 265,063

[52] U.S. Cl. .................................................. 343/103
[51] Int. Cl. ............................................... G01s 1/24
[58] Field of Search ....................... 343/103; 328/130

[56] References Cited
UNITED STATES PATENTS

| | | | |
|---|---|---|---|
| 2,873,444 | 2/1959 | Dean | 343/103 |
| 3,325,810 | 6/1967 | Frank et al. | 343/103 |
| 3,685,052 | 8/1972 | Van Etten | 343/103 |

*Primary Examiner*—Benjamin A. Borchelt
*Assistant Examiner*—S. C. Buczinski
*Attorney*—C. Cornell Remsen, Jr. et al.

[57] ABSTRACT

This invention relates to a method of reducing the envelope-to-cycle discrepancy (ECD) in a digital sample data system such as is used in radio navigation systems; i.e., Loran. Incoming pulsed carrier signals are amplitude sampled to determine the time position on the rising edge of the pulse envelope. In this way, the correct carrier phase is selected to eliminate ambiguities between lanes that occur every carrier cycle. The instantaneous envelope-to-cycle discrepancy of the received signal is measured with respect to an internally stored shape factor K, and averaged to reduce noise for a length of time determined by the signal-to-noise ratio or for a fixed length of time determined by worst case conditions. A cycle jump test is performed to determine whether the average error is due to a timing error or is truly an envelope-to-cycle discrepancy bias error, the threshold being ±5 microseconds which is one-half of a carrier cycle. The ECD is then driven to a null by updating an integrator which holds the accumulated ECD and which is fed back and subtracted from the envelope-to-cycle discrepancy measured on the incoming signal.

2 Claims, 4 Drawing Figures

3,774,210

AUTOMATIC CALIBRATION OF LORAN ENVELOPE TO CYCLE DISCREPANCY

BACKGROUND OF THE INVENTION

This invention relates to a digital sample data system of the type used in radio navigation systems such as Loran, and more particularly to the reduction of envelope-to-cycle discrepancy (ECD).

In a Loran system, the hyperbolic line of position is established by measuring the difference in time of arrival of synchronized, pulsed signals from a master and a slave transmitting station. Precision time differences are determined by measuring the difference in phase of the synchronized, 100 KHz, RF-carriers of the master and slave pulses. The time difference measurement is performed in two steps. The coarse indication is obtained by establishing sampling points on the rising edge envelopes of each pulse and measuring the time difference between the sampling points. This measurement is called the envelope reading. The fine or vernier indication is obtained by measuring the difference in phase of the 100 KHz, RF-signals at the sampling points and is called the cycle or phase reading. The two measurements are made in separate channels of the receiver, and the final time-difference value is determined by applying the fine cycle reading to the coarse envelope reading. Since one cycle of energy at 100 KHz represents 10 microseconds, the envelope reading must be correct within ± 5 microseconds in order to resolve the cycle ambiguity of the phase measurement. Current receivers must operate with an ECD of up to ± 4 microseconds, up to 35 db of CW interference, and in a signal-to-noise ratio down to −20db with excursions of the envelope reading not exceeding ± 5 microseconds. With less interference and noise relative to the signals, the fluctuation in the envelope channel decrease. If coherent interference exists, it is possible to create a constant offset to the reading in the envelope channel. In either case, however, an envelope-to-cycle difference in the readings may result which is the sum of an ECD-induced bias and an error due to noise or CW interference. When this difference approaches ± 5 microseconds, it leads to ambiguity in the time difference reading. For example, if the envelope reading were 14856.2 and the cycle readings 6.22, the composite time difference reading would be 14856.22. However, if because of noise or interference the envelope reading would be driven off to 14851.2 while the cycle reading remains the same, the time difference value could be either 14856.22 or 14846.22. The transformation from Loran time differences to geographic coordinates is usually accomplished in a computer. As a result, the computer would see a 10 microsecond jump in the hyperbolic line of position.

The envelope measurement function selects the carrier cycle to be phased tracked thereby eliminating lane ambiguity present in CW systems. The choice is made based on signal slope measurement on the leading edge of the Loran pulse. A proper cycle selection is made if the envelope measurement function estimates the sampling point to within one-half cycle of the carrier or as stated above 5 microseconds.

There are two main sources of error which can cause the envelope measurement to exceed this 5 microsecond threshold. These are noise (or other unwanted signals) or the above described envelope-to-cycle discrepancy (ECD). ECD is an envelope measurement bias resulting from propagation path distortion and circuit instabilities in transmitter and receiver which cause a relative shift between the carrier cycles and the pulse envelope. Since noise and ECD act jointly to cause faulty cycle selection, ECD has generally caused the imposition of additional noise smoothing on the envelope measurement in order to reduce noise error. This smoothing requirement can amount to several minutes or more, and therefore significantly increase signal settling times, i.e., the time necessary to select the proper carrier cycle. Furthermore, if the ECD increases past the 5 microsecond threshold, without compensation in the system, envelope tracking must be disabled.

SUMMARY OF THE INVENTION

It is an object of the present invention to provide a method of reducing the envelope-to-cycle discrepancy measured by an airborne receiver as it moves through the service area by continuously tracking and nulling the difference between the received and internal envelope shapes.

According to a broad aspect of the invention there is provided an improved method of reducing the envelope-to-cycle discrepancy in a Loran navigation system of the type wherein pulses are received on a 100 KHz carrier and wherein there is performed an envelope measurement and a cycle reading for determining the time difference between pulsed signals from a master transmitting station and a slave transmitting station comprising sampling an incoming signal at times $t_1$ and $t_2$ yield voltages $e(t_1)$ and $e(t_2)$, forming a received envelope shape factor $K_{sig} = e(t_1)/e(t_2)$, comparing said received envelope shape factor $K_{sig}$ with an internally generated shape factor $K$, measuring envelope-to-cycle discrepancy (ECD) according to $ECD = e(t_1) - Ke(t_2)$, averaging said envelope-to-cycle discrepancy over a predetermined period of time, said period of time depending on the signal-to-noise ratio, performing a cycle jump test to determine if the averaged error is truly an envelope to cycle discrepancy and not a timing error, and integrating said averaged error to modify said internal envelope shape factor $K$, thereby reducing envelope-to-cycle discrepancy.

By closing a Type I loop around the envelope measurement, constantly changing ECD can be nulled with only small noise induced errors. As a result, the noise error in the cycle selection measurement is allowed to increase thereby descreasing necessary smoothing time and signal settling time. Also, the geographical area where cycle selection is reliable is extended.

The above and other objects of the present invention will be more clearly understood from the following detailed description taken in conjunction with the accompanying drawings in which:

DESCRIPTION OF THE PREFERRED EMBODIMENT

The techniques employed in the Loran navigation system are well known and is is not deemed necessary to discuss them further. For a more complete discussion refer to "IEEE Transactions on Aerospace and Electronics Systems" Vol. AES-2, No. 1, Jan., 1966, pages 74–88, entitled "Microminiature Loran-C Receivers/Indicator" by R.A. Reilly and "Electrical Communication" Vol. 45 No. 2, 1970, entitled "Loran-C System and Product Development" by J.P. Van Etten.

Figure 2:
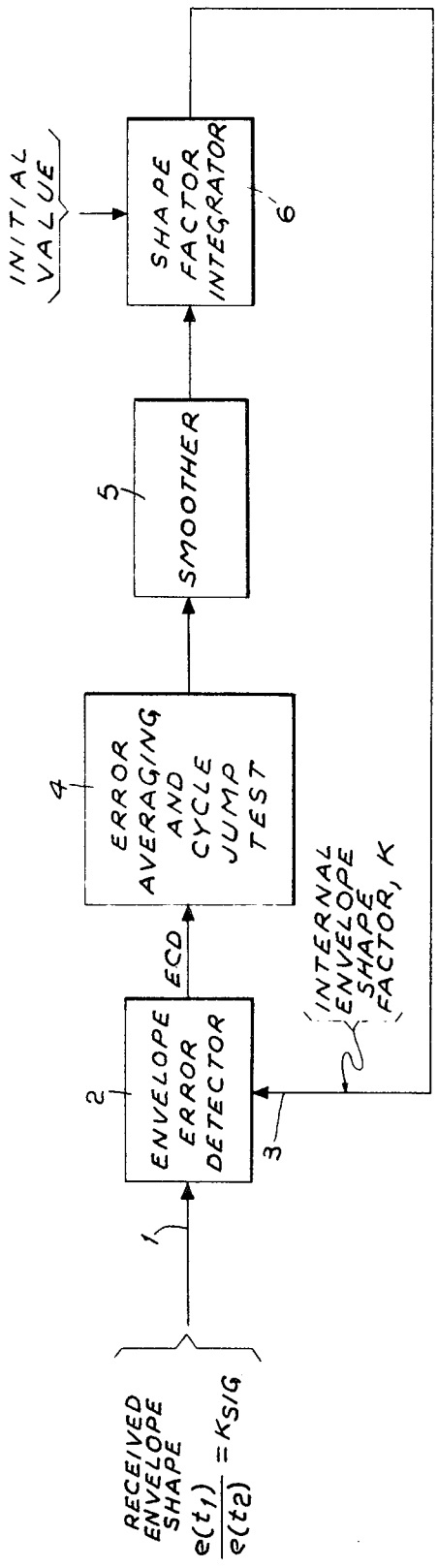
FIG. 2 is a functional block diagram for configuring the inventive method of reducing envelope-to-cycle discrepancy.
Figure 3:
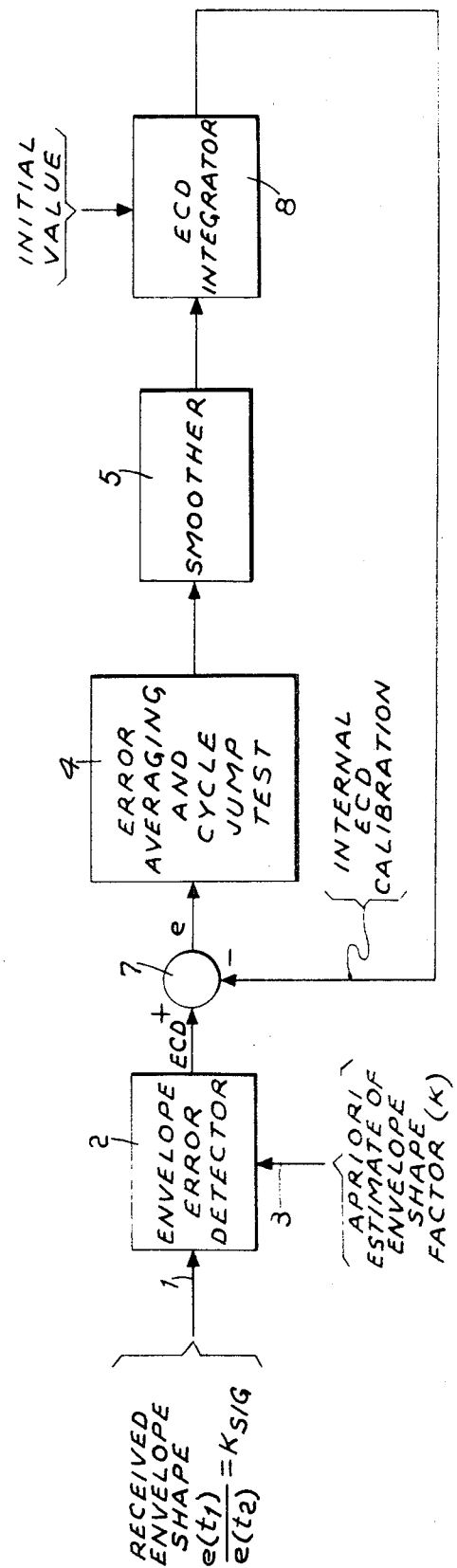
FIG. 3 is a functional block diagram of a further embodiment configuring the inventive method.

FIG. 2 illustrates the configuration employed for self-calibration of ECD in a LORAN receiver. FIG. 3 is a variation of the first technique and may be more suitable for use where the envelope error detector constant, K, cannot be easily controlled. Both methods yield essentially the same results.

Figure 1:
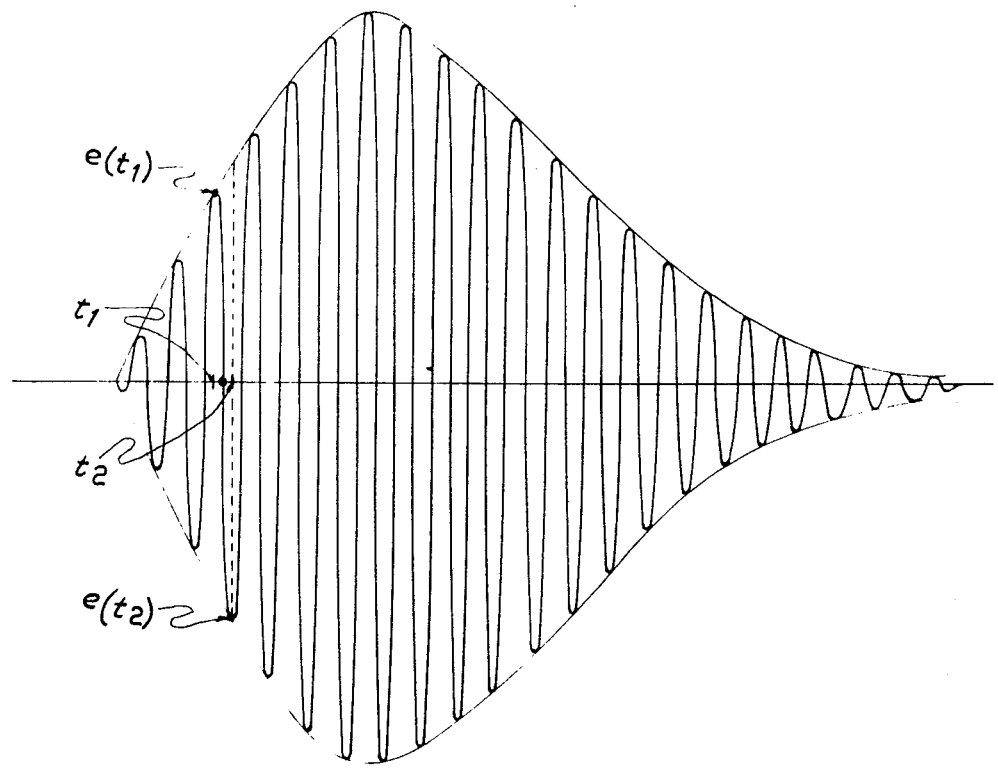
FIG. 1 is a curve representing a single Loran pulse and indicated thereon is a sampling point which, when displaced above a predetermined threshold, can cause the selection of the wrong cycle to be phase tracked.

In FIG. 2, the envelope error or ECD is detected in envelope error detector 1 according to the equation:

$$ECD = e(t_1) - Ke(t_2) \text{ volts}$$

where $e(t_1)$ and $e(t_2)$ are amplitude measurements on the LORAN pulse, shown in FIG. 1, leading edge and K is the apriori estimate of their ratio when they define the correct sampling point. Amplitude $e(t_2)$ is normalized to a predetermined voltage by automatic gain control.

But the ratio of $e(t_1)$ to $e(t_2)$ on the received signal is $K_{sig}$. Therefore, $ECD = e(t_2)(K_{sig} - K)$ volts. This error is expressed in microseconds by normalizing to the error found when sampling the envelope 10 microseconds off the correct position, which is a one cycle error.

Therefore:

ERROR VOLTAGE = $e(t_2)(K_{10} - K)$ volts for 10 $\mu$s envelope error

ERROR GRADIENT = $e(t_2)(K_{10} - K)/10$ volts/microseconds of error $ECD = 10(k_{sig} - K)/(K_{10} - K)$ microseconds where $K_{10}$ is the amplitude ratio when sampling the envelope with a 10 microsecond error.

Referring to FIG. 1, the received envelope shape corresponding to $e(t_1)/e(t_2) = K_{sig}$ is received in envelope error detector 2 via input terminal 1. Also received by envelope detector 2 is the internally generated envelope shape factor K. The ECD is proportional to the difference in received and internal envelope shape factors as previously expressed in the equation for ECD. To know the ECD, the average envelope error is determined in error averaging unit 4, and after a full integration period without a cycle jump is used to correct the internal shape factor integrator 6 which receives the output of smoother 5 which may comprise nothing more than a divider. The length of time over which the error is averaged in unit 4 is determined by the signal-to-noise ratio. After a full integration period, without a cycle jump, the output of error averaging unit 4 via smoother 5 is used to correct the contents of internal shape factor integrator 6 which acts as an accumulator. Also received by shape factor integrator 6 is a predetermined initial value. Shape factor integrator 6 is not updated if a cycle jump is made since this represents an indication of a timing error rather ECD. The output of shape factor integrator 6, K, is fed back to envelope error detector 2. Since integrator 6 has been updated by a fraction of the average ECD, the value of K will be driven closer to the value of $K_{sig}$ and the ECD measured by envelope error detector 2 will diminish toward zero.

In FIG. 3, envelope error detector 2 is external to the calibrating loop. The component of ECD to the right of feedback summing point 7, e, which is used to determine a cycle jump, is nulled. This is simply a variation in technique to allow nulling of ECD when practical considerations require the envelope detector constant K to remain a constant value as in an analog implementation.

The envelope jump test is performed by integrating the detected envelope error for a period T and comparing the result to a threshold. This is equivalent to computing the average error. A low pass filter operating continuously with a time constant $\tau_1 = T/2$ may be substituted to obtain the same statistical results. The use of low pass filter 9 in FIG. 4 allows noise performance to be easily calculated.

Figure 4:
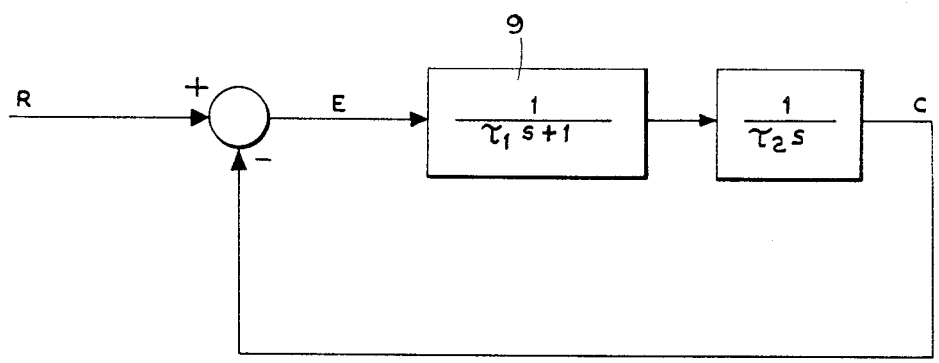
FIG. 4 is a mathematical representation of the arrangement shown in FIG. 3.

Referring again to FIG. 2, since the average ECD is only sent to the shape integrator every T seconds, the scaling time constant of the shape integrator, $\tau_2$, must be greater than T. The LaPlace transform representation of the technique is shown in FIG. 4, where $\tau_1 = T/2$; $\tau_2 = nT = 2n\tau_1$.
Then, $$C/R(S) = (1/\tau_1 \tau_2)/S^2 + (1/\tau_1)S + 1/\tau_1 \tau_2$$

The input noise power spectral density can be demonstrated to be the following for the typical RF filtering shown:

$$\eta = \frac{\left(\frac{19.4}{S/N}\right)^2}{2\pi PRR}(\mu s)^2 - \sec. \quad \left.\begin{array}{l}\text{LORAN-C Mode 25 KHz} \\ \text{bandwidth 3 pole Linear} \\ \text{Phase Filter}\end{array}\right.$$

The output standard deviation can then be calculated as: $\sigma = 19.4/S/N \cdot 1/\sqrt{2\tau_2 PRR}$ $\mu$sec, rms Here, PRR is pulse repetition rate and S/N the signal to noise ratio. To allow $\sigma = 0.5$ $\mu$sec (a reasonable value) at S/N = 1/10 and PRR = 80 for LORAN-C, rate SS-O: $\tau_2 = 960$ seconds.

In the "next-generation" LORAN system currently under development by ITT, T is made a function of S/N ratio and is given by:

$$T = 12/S/N \text{ seconds } S/N < 1$$

$$\tau = nT = 12n/S/N$$

The factor n is chosen to yield $\tau_2 = 960$ at S/N = 1/10. Therefore:

$$n = 8$$

$$\tau_2 = 96/S/N$$

If the aircraft is flying through an area where ECD is a linear function of distance, the envelope system is experiencing an ECD ramp input of magnitude:

$$V_{ECD} = WV_{AC}/3600 \text{ }\mu s/\text{second}$$

where:
$V_{ECD}$ is the time rate of change of ECD in $\mu$sec/sec.
W is the ECD distance gradient in $\mu$sec/nm.
$V_{AC}$ is the aircraft velocity in nm/hr.

The steady state lag error in ECD tracking is:
$E_{SS} = V_{ECD} \tau_2$ $\mu$sec $$E_{SS} = 0.027 \, WV_{AC}/S/N \, \mu sec$$

The above equation allows a calculation of lag in ECD calibration as a function of ECD gradient, $W$, aircraft velocity, $V_{AC}$, and S/N ratio. If $E_{SS} = 1 \, \mu sec$ is considered tolerable, $$W \approx 40 \, S/N/V_{AC} \, \mu sec/nm$$

At 600 knots and S/N = 1, the permissable ECD gradient is 6 $\mu$sec in 100nm. In general, this order of magnitude for permissable ECD gradient is large enough to satisfy most real world variations.

It is to be understood that the foregoing description of specific examples of this invention is made by way of example only and is not to be considered as a limitation on its scope.

We claim:

1. An improved method of reducing the envelope-to-cycle discrepancy in a Loran navigation system of the type wherein pulses are received on a 100 kc/s carrier and wherein there is performed an envelope measurement and a cycle reading for determining the time difference between pulsed signals from a master transmitting station and a slave transmitting station comprising:

sampling an incoming signal at times $t_1$ and $t_2$ to yield voltages $e(t_1)$ and $e(t_2)$;

forming a received envelope shape factor $K_{sig} = e(t_1)/e(t_2)$;

comparing said received envelope shape factor $K_{sig}$ with an internally generated predetermined shape factor K;

measuring envelope to cycle discrepancy (ECD) according to $ECD = e(t_1) - K\,e(t_2)$;

averaging said envelope to cycle discrepancy over a predetermined period of time, said period of time depending on the signal-to-noise ratio;

performing a cycle jump test to determine if the averaged error is truly an envelope to cycle discrepancy and not a timing error; and integrating said averaged error to generate said internal envelope shape factor K.

2. An improved method of reducing the envelope-to-cycle discrepancy in a Loran navigation system of the type wherein pulses are received on a 100 KHz carrier and wherein there is performed an envelope measurement and a cycle reading for determining the time difference between pulsed signals from a master transmitting station and a slave transmitting station comprising:

sampling an incoming signal at times $t_1$ and $t_2$ yield voltages $e(t_1)$ and $e(t_2)$;

forming a received envelope shape factor $K_{sig}=e(t_1)/e(t_2)$;

comparing said received envelope shape factor with an internally generated apriori estimate of said envelope shape factor;

measuring envelope-to-cycle discrepancy (ECD) according to $ECD = e(t_1) - K\,e(t_2)$;

averaging a component of said envelope-to-cycle discrepancy over a predetermined period of time, said period of time depending on the signal-to-noise ratio;

performing a cycle jump test to determine if the averaged error is truly an envelope to cycle discrepancy and not a timing error;

integrating said averaged error; and subtracting said integrated average error from said envelope to cycle discrepancy to yield said component.

* * * * *